United States Patent [19]
Baumann et al.

[11] 3,741,278
[45] June 26, 1973

[54] AUTOMATED METHOD OF MANUFACTURING FINNED MACHINE FRAMES

[75] Inventors: Frederick W. Baumann, Scotia; William R. Smith, Ballston Lake; Robert G. MacNary, Elnora; Albert R. Miller, Albany; William W. Pangburn, Delanson; George M. Rosenberry, Jr., Elnora; Bernard C. Kaczkowski, Schenectady, all of N.Y.

[73] Assignee: General Electric Company, Schenectady, N.Y.

[22] Filed: Jan. 24, 1972

[21] Appl. No.: 220,279

[52] U.S. Cl.................. 164/114, 164/131, 164/137
[51] Int. Cl............................................. B22d 13/02
[58] Field of Search.................... 164/114, 116, 131, 164/137, 292, 295, 342, 343, 401, 404; 425/435; 269/48.1

[56] References Cited
UNITED STATES PATENTS

| | | | |
|---|---|---|---|
| 5,988 | 12/1848 | Lovegrove | 164/114 |
| 2,616,462 | 11/1952 | Haddican | 269/48.1 X |
| 2,932,874 | 4/1960 | Ludwig et al. | 425/435 X |

FOREIGN PATENTS OR APPLICATIONS

| | | | |
|---|---|---|---|
| 488,074 | 12/1953 | Italy | 425/435 |

Primary Examiner—Robert D. Baldwin
Attorney—Vale P. Myles et al.

[57] ABSTRACT

A highly automated method of centrifugally casting large diameter finned dynamoelectric machine frames is described utilizing a sectionalized mold which is automatically dismembered and reassembled subsequent to casting. The sectionalized mold is provided with large circular wheels at opposite ends of the mold and the wheels are placed atop substantially horizontal rollers which transmit rotary torque to the mold during centrifugal casting. Subsequent to casting, the mold is lifted vertically from the rollers and placed in a vertical disposition atop the arbor of a mold stripping machine whereafter sections of the mold are sequentially stripped from the cast (with the cast and stripped sections being rotated subsequent to the stripping of each section). The cast frame then is lifted from the arbor and the mold is reassembled by advancement of the stripping machine jaw to sequentially push the mold sections toward the arbor.

5 Claims, 14 Drawing Figures

MOLD DISASSEMBLE STEPPING RELAY

| POS | \multicolumn{10}{c|}{CONTACTS} |||||||||||
|---|---|---|---|---|---|---|---|---|---|---|
|  | 1 | 2 | 3 | 4 | 5 | 6 | 7 | 8 | 9 | 10 |
| 1 | X |   |   |   |   |   |   |   |   |   |
| 2 |   | X |   |   |   |   |   |   |   |   |
| 3 |   |   | X |   |   |   |   |   |   |   |
| 4 |   |   |   | X |   |   |   |   |   |   |
| 5 |   |   |   |   | X |   |   |   |   |   |
| 6 |   |   |   |   |   | X |   |   |   |   |
| 7 |   |   |   |   |   |   | X |   |   |   |
| 8 |   |   |   |   |   |   |   | X |   |   |
| 9 |   |   |   |   |   |   |   |   | X |   |
| 10 |   |   |   |   |   |   |   |   |   | X |

X = CLOSED

FUNCTION INITIATED

- PISTON 91 TO MOLD
- PISTON 85 TO MOLD
- PINS DOWN
- EXPAND ARBOR 16
- PISTON 85 FROM MOLD
- PISTON 91 FROM MOLD
- PINS UP
- PISTON 91 FROM MOLD
- CONTRACT ARBOR
- INITIATE TABLE ROTATION

MOLD DISASSEMBLE TABLE ROTATION STEPPING RELAY

| POS | 1 | 2 | 3 | 4 | 5 | 6 | 7 |
|---|---|---|---|---|---|---|---|
| 1 | X |   |   |   |   | X |   |
| 2 |   |   | X | X |   |   |   |
| 3 |   |   | X |   |   | X |   |
| 4 |   |   |   | X | X |   |   |
| 5 |   |   |   |   | X | X |   |
| 6 |   | X |   |   |   | X |   |
| 7 |   | X |   |   |   | X |   |
| 8 |   |   |   |   |   |   | X |

X = CLOSED

FUNCTION INITIATED

- SIDE 1 AT JAW
- ROTATE 180°
- SIDE 2 AT JAW
- ROTATE 90°
- SIDE 3 AT JAW
- ROTATE 180°
- SIDE 4 AT JAW
- STAND STILL

MOLD ASSEMBLE
STEPPING RELAY

| POS | \multicolumn{5}{c}{CONTACTS} | FUNCTION INITIATED |
|---|---|---|---|---|---|---|

| POS | 1 | 2 | 3 | 4 | 5 |
|---|---|---|---|---|---|
| 1 | X | | | | |
| 2 | | X | | | |
| 3 | | | X | | |
| 4 | | | | X | |
| 5 | | | | | X |
| X = CLOSED | | | | | |

FUNCTION INITIATED

PISTON 91 TO MOLD
PISTON 85 TO MOLD
PISTON 85 FROM MOLD
PISTON 91 FROM MOLD
INITIATE TABLE ROTATION

MOLD ASSEMBLE
TABLE ROTATION STEPPING RELAY

| POS | 1 | 2 | 3 | 4 | 5 | 6 | 7 |
|---|---|---|---|---|---|---|---|
| 1 | X | | | | | X | |
| 2 | | | | X | X | | |
| 3 | | | X | | X | | |
| 4 | | X | | X | | | |
| 5 | | X | | | | X | |
| 6 | X | | | | | X | |
| 7 | X | | | | X | | |
| 8 | | | | | | | X |
| X = CLOSED | | | | | | | |

FUNCTION INITIATED

SIDE 1 AT JAW
ROTATE 180°
SIDE 2 AT JAW
ROTATE 270°
SIDE 3 AT JAW
ROTATE 180°
SIDE 4 AT JAW
STAND STILL

FIG.14

AUTOMATED METHOD OF MANUFACTURING FINNED MACHINE FRAMES

This invention relates to a method of manufacturing large diameter finned frames for dynamoelectric machines wherein the frames are centrifugally cast and the mold is subsequently stripped from the cast and reassembled in a substantially automated process.

In the manufacture of dynamoelectric machines, a number of diverse techniques have been proposed and/or utilized to fabricate machine frames dependent upon such diverse factors as the size and number of frames to be cast. For example, high pressure die casting techniques thertofore have been employed to produce machine frames below approximately 10 inches in diameter on a high volume basis. Because of the significant cost entailed in the manufacture of dies for high pressure castings, machine frames above ten inches in diameter generally have not been formed by high pressure die casting but rather have been formed by sand casting or extrusion techniques. Sand casting of machine frames, however, requires time consuming preparation of a sand mold for each cast (with the mold necessarily being destroyed after each cast) while fabrication of a machine frame from extruded arcuate segments of the frame requires welding of the segments to form the cylindrical frame.

While centrifugal casting techniques have been known for many years, such techniques primarily have been limited to casting structures having smooth outer surfaces, such as metal pipes, or for applying interior surfaces to pre-formed objects, e.g., casting brake linings along the interior of brake drums. Centrifugal casting also has been proposed as a suitable technique for forming a synthetic material housing about the stator of a dynamoelectric machine without interfering with a rotor centrally positioned within the stator by means of shims during casting. However, for large diameter metal machine frames having peripheral fins for cooling of the machine during subsequent operation, the weight of such composite structure and the adhesion between the cast and the mold becomes significant negating (until the present invention) the use of centrifugal casting techniques for manufacturing finned frames above about ten inches in diameter. Moreover, the adaptability of centrifugal casting to a highly automated process for stripping the mold from the cast was not appreciated until this invention.

It is therefore an object of this invention to provide a highly automated method of manufacturing finned frames for large diameter dynamoelectric machines.

It is also an object of this invention to provide a highly automated method of manufacturing machine frames wherein the frame is cast, the mold stripped from the cast and the mold reassembled for a variety of large diameter frame sizes with a minimum change in machine components.

It is a still further object of this invention to provide a method of manufacturing diversely dimensioned motor frames at minimum cost.

These and other objects of this invention generally are achieved by mutually joining individual sections of a multi-sectioned mold to produce a cylindrical inner surface substantially complimentary to the machine frame to be cast with the outer periphery of the mold being cylindrically smooth over at least a portion of the axial span of the mold. The mold then is disposed in an approximately horizontal attitude atop at least two arcutely displaced rotable members in communication with the smooth cylindrical surface of the mold and torque is applied to the mold from at least one of the rotatable members to rotate the mold at a predetermined speed. During rotation of the mold, molten metal is poured into the mold interior and a machine frame is centrifugally cast therein. After casting, the mold is removed from the rotatable members and positioned in a substantially vertical disposition atop a stripping machine whereafter force is applied to individual mold sections to strip the sections from the cast. When all mold sections have been stripped from the cast, the cast is removed from atop the arbor and a force in a direction opposite the stripping force is applied to each section to reassemble the mold into a composite unit.

Although this invention is described with particularity in the appended claims, a more complete understanding of the automated frame fabrication process may be obtained from the following detailed description of a specific embodiment of the invention taken in conjunction with the appended drawings wherein:

Figure 1:
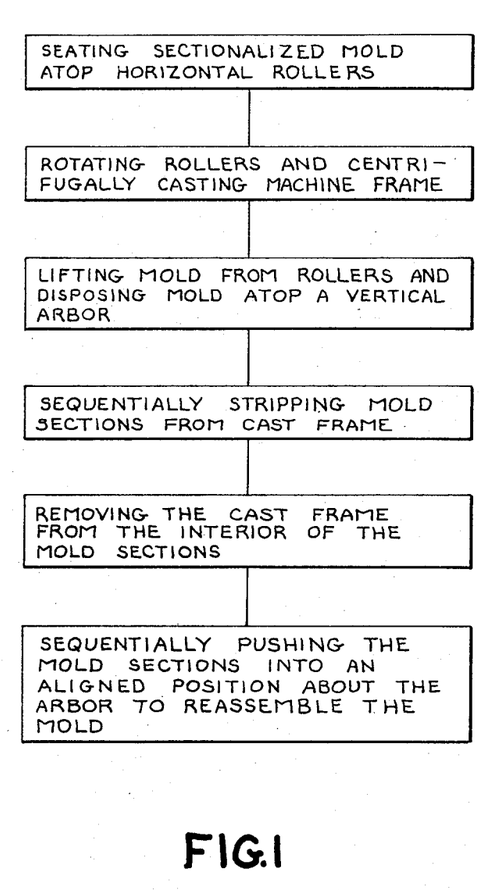
FIG. 1 is a flow chart illustrating in block diagram form the method of this invention.

The method of this invention for forming centrifugally cast machine frames of large diameter is illustrated in FIG. 1 and generally includes seating a sectionalized mold atop horizontally disposed rollers and rotating the rollers to centrifugally cast liquid metal poured into the mold interior during rotation of the mold. The mold then is lifted from the rollers and disposed in a vertical position atop an arbor whereafter the sections of the mold are sequentially stripped from the cast frame. After all the mold sections have been stripped from the frame, the frame is removed from the interior of the stripped mold sections and the sections are sequentially pushed into an aligned position about the arbor to reassemble the mold for subsequent casts.

Figure 2:
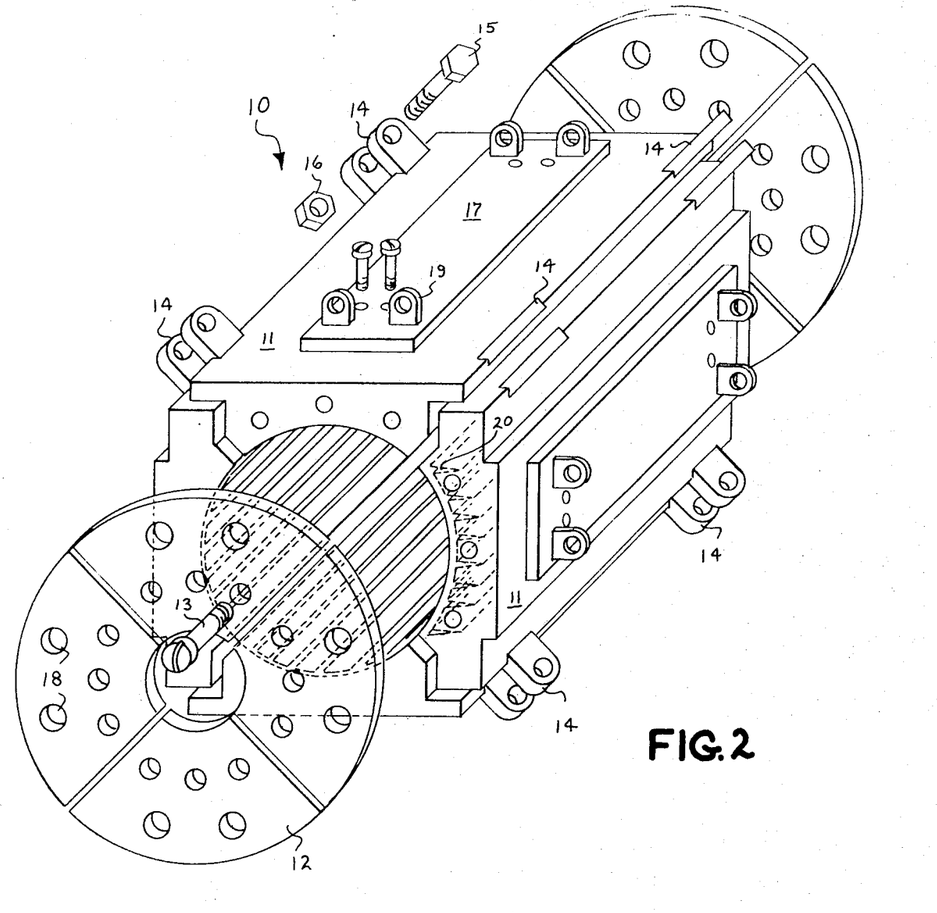
FIG. 2 is an exploded isometric view of a mold suitable for utilization with this invention.

A sectionalized mold 10 preferred for utilization in this invention is illustrated in FIG. 2 and generally comprises four arcuate sections 11 having the quadrature of a circular plate 12 affixed at each end thereof, e.g., by bolts 13, to form a circumferentially smooth wheel upon juxtaposition of the four arcuate sections. The longitudinal edges of each section of the mold also are provided with axially displaced eyelets 14 to accept bolts 15 passing therethrough to form a mechanically secure structure upon engagement with nuts 16 while a bracket 17 is fixedly secured to the outer periphery of each mold section to permit the application of a pulling force to the mold sections. Because the radial extent of circular plates 12 desirably is greater than the radial protrusion of brackets 17 in order to permit rotation of the mold upon elongated rollers (as will be explained more fully hereinafter), apertures 18 are provided through each quadrature of circular plate 12 permitting the passage of axially removed rods through apertures 19 within brackets 17.

Typically, mold 10 is of relatively large diameter being designed for the casting of machine frames above approximately 10 inches in diameter. To provide the axially extending cooling fins customarily utilized along the periphery of a dynamoelectric machine, a plurality of triangular grooves 20 are notched into the interior of each mold surface in substantially parallel disposition. In conventional fashion, the sides of the grooves taper at an angle of 3°–5° with entry into the mold sections to permit ready release of the sections from the cast while similarly tapered notches (not shown) also are provided to form the feet and connection box of the cast machine frame. Typically, arcuate sections 11 are formed of cast iron because of the good release qualities of such material while circular plates 12 preferably are formed of a harder material, such as steel, to inhibit wear of the plates during casting. The foregoing mold is described and claimed in Baumann et al. application Ser. No. 220,286 filed concurrently herewith and assigned to the assignee of the present invention.

Figure 3:
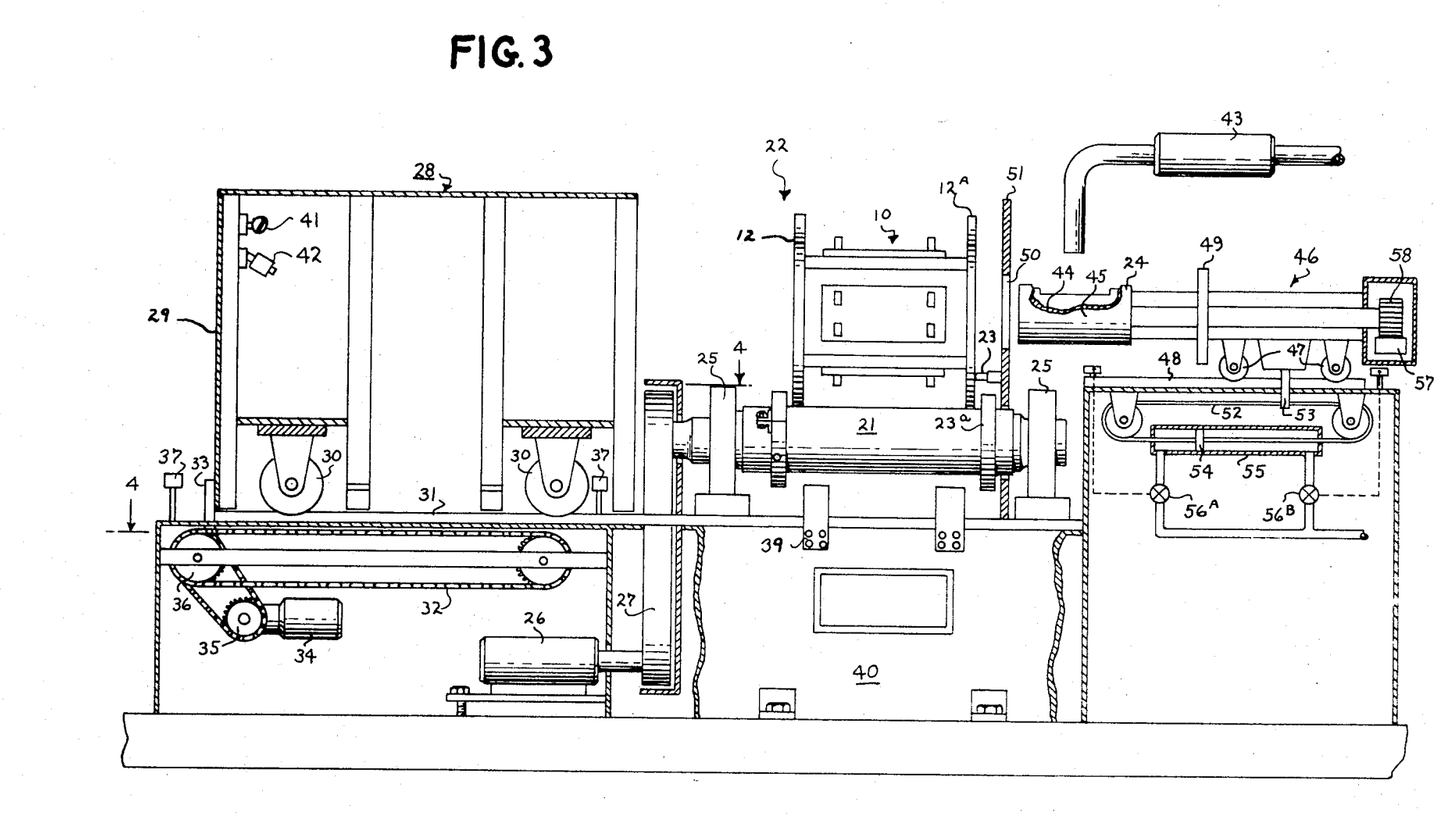
FIG. 3 is a partially sectionalized view of a casting machine suitable for centrifugally casting motor frames utilizing the mold of FIG. 2.
Figure 4:
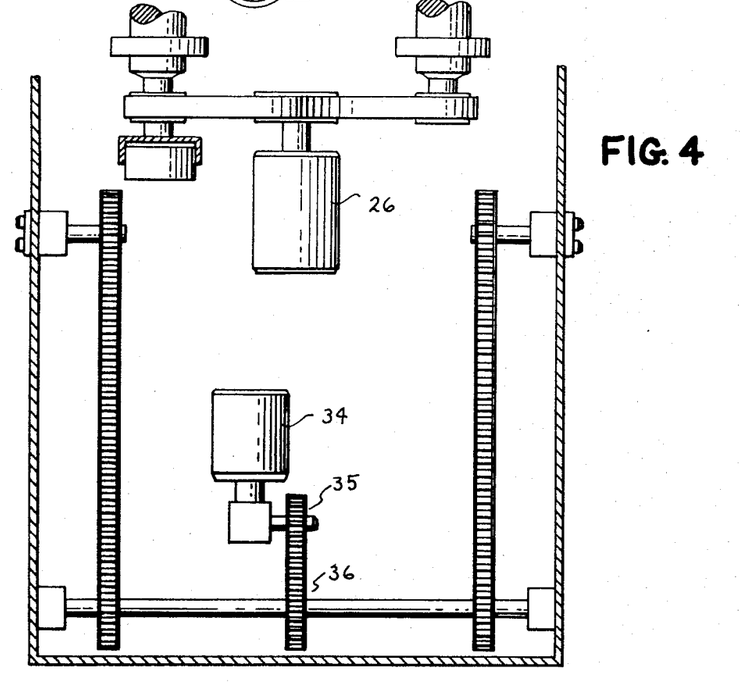
FIG. 4 is a sectionalized view taken along lines 4—4 of FIG. 3 to illustrate the hood and roller drive of the casting machine.

To cast machine frames, mold 10 preferably is placed atop a pair of arcuately displaced elongated rollers 21 of casting machine 22, illustrated in FIGS. 3–6 of the instant application and described and claimed in Baumann et al. application Ser. No. 220,285 filed concurrently herewith and assigned to the instant assignee. Referring to FIG. 3 of the present application, rollers 21 preferably are inclined at an angle less than three degrees, and typically 0°10′, form a horizontal plane to continuously bear circular plate 12A against a rotary surface 23, or collar 23a fixedly secured on each of rollers 21, thereby maintaining a constant span between the plate and ladle 24 employed to deposit molten charge within the mold. Thus, machine frames of differing axial length can be cast without altering the span of traversal required to insert the ladle into each mold. In conventional fashion, the rollers of the casting machine are mounted at opposite ends eithin bearings 25 to permit rotation of the rollers by drive motor 26 through a flexible drive belt 27.

A hood 28 is employed to enclose the mold during casting and generally includes a rectangular, substantially enclosed housing 29 mounted on wheels 30 to permit a longitudinal traversal of the hood along angle iron rails 31. The drive for the hood is provided from chains 32 fixed secured to the back end of the hood by brackets 33 with rotary torque being applied to the chain from motor 34 by way of driven sprockets 35 and 36 (illustrated more clearly in FIG. 4). A plurality of limit switches, generally identified by reference numeral 37, also are provided along the length of the hood traversal to control the operation of drive motor 34 in conventional fashion.

Figure 5:
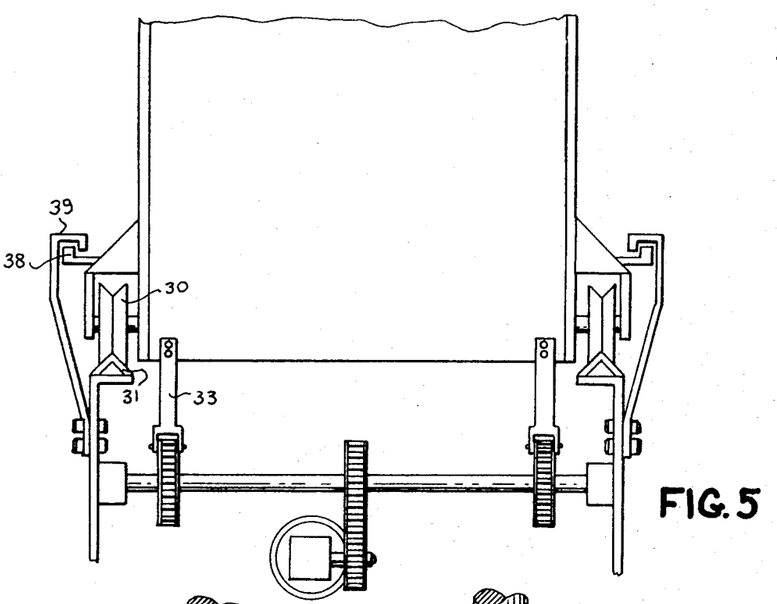
FIG. 5 is an end view of the casting machine illustrating the hood hold down mechanism.
Figure 6:
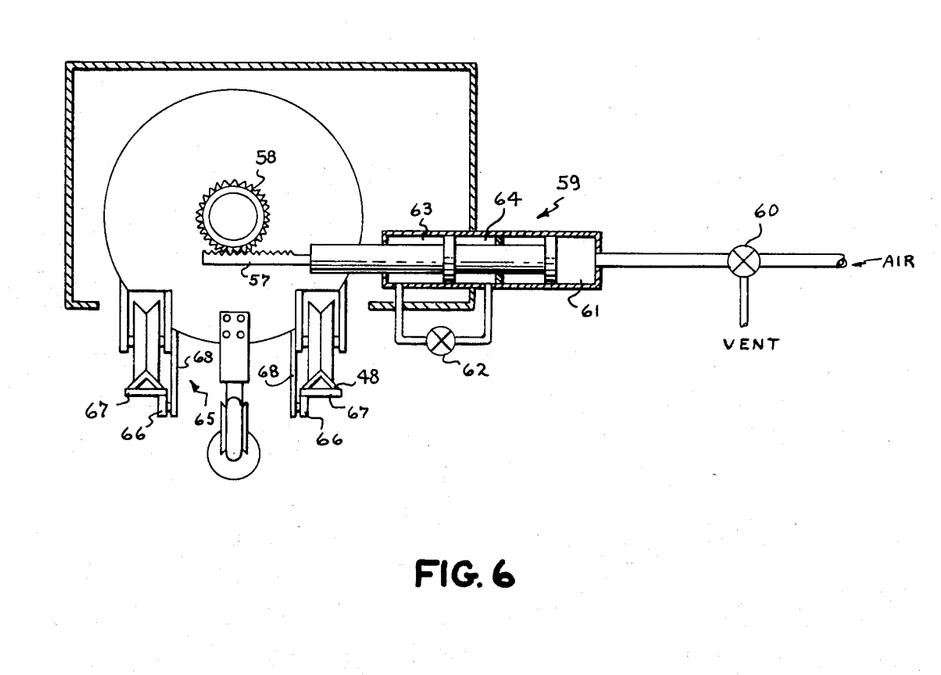
FIG. 6 is an illustration of a preferred pouring mechanism for the casting machine ladle.

As can be seen more clearly in FIG. 5, hood 28 also is provided with four generally L-shaped brackets 38 which become axially registered with and underlie hold down brackets 39 fixedly secured to base 40 of casting machine 22 to inhibit lifting of the hood from rails 31 after the hood has been rolled into an overlying position relative to mold 10. Desirably, the top of hood 28 is separated from circular plates 12 of mold 10 by less than the radius of rollers 21 to inhibit disengagement of the mold from the arcuately displaced rollers during casting. As is illustrated in FIG. 3, a spotlight 41 and a television monitoring camera 42 may be mounted along the interior face of the hood remote from the mold to permit monitoring of the casting operation.

After hood 28 has been rolled to an overlying attitude relative to mold 10, molten metal is poured into ladle 24 by a suitable metering device, such as metal pump 43, to provide a sufficient charge for casting a machine frame of the size corresponding to mold 10. The ladle itself generally is characterized by an insulating lining 44 of ceramic material to contain the heat of the molten metal while an outer metallic covering 45 serves to inhibit damage to the underlying insulating lining. One end of ladle 24 is secured to a carriage 46 having wheels 47 traversable along rails 48 to permit insertion of the ladle into the mold interior. A plate 49 also is provided between the ladle and the carriage to close aperture 50 of hood end 51 to completely shroud the mold when ladle 24 is traversed to a pouring position.

Because casting machine 22 desirably is employed for various diameter molds utilized to cast diverse machine frame sizes, the rate of insertion of the ladle into the mold preferably is controllable to inhibit spillage of molten metal while retaining maximum heat content therein. The drive for carriage 46 to effect this result is provided by a cable secured to the underside of the carriage by a plate 53 with longitudinal motion being imparted to the cable from piston 54 fixedly secured to the cable within cylinder 55. When the ladle is to be inserted into the mold, valve 56A is opened by the operator to a setting admitting air to cylinder 55 in a quantity to traverse the carriage at the desired speed into the mold whereafter the ladle is rotated by rack 57 meshed with pinion 58 to pour the charge into the rotating mold at a rate dependent upon the quantity of charge within the ladle. In general, a charge of approximately 80 pounds of molten metal should be poured into a mold rotating at approximately 400 rpm within approximately 4 seconds while larger molds, e.g., those requiring approximately 200 pounds of molten charge, may require approximately 6 seconds to complete pouring in order to obtain a homogeneous cast without excessive splashing. Thus, notwithstanding the fact that a substantially constant pouring rate may be desired for each size mold, the rate of pour will vary dependent upon the frame size being cast in order to obtain optimum casting qualities in the frame.

To control the pour rate of the charge into the mold, a commercially available air-hydraulic cylinder 59 (illustrated in FIG. 6) is employed to drive rack 57 after admission of air through valve 60 to chamber 61. Valve 62 then is opened to pass hydraulic fluid from chamber 63 to chamber 64 in quantities to produce the desired pour rate from ladle 24.

Because ladle 24 is required to carry differing quantities of molten metal charge dependent upon the frame size to be cast, carriage 46 cannot be completely counterbalanced. To inhibit tipping of the carriage when large quantities of charge are required for casting, cam followers 65 are provided beneath the rear wheels of the carriage to continuously apply a stabilizing force to the carriage. The cam followers basically include a roller 66 bearing against the under surface of plate 67 upon which angle iron rails 48 are situated with the roller being pinned to a vertical plate 68 secured to the carriage housing to move the cam followers with the carriage.

Figure 7:
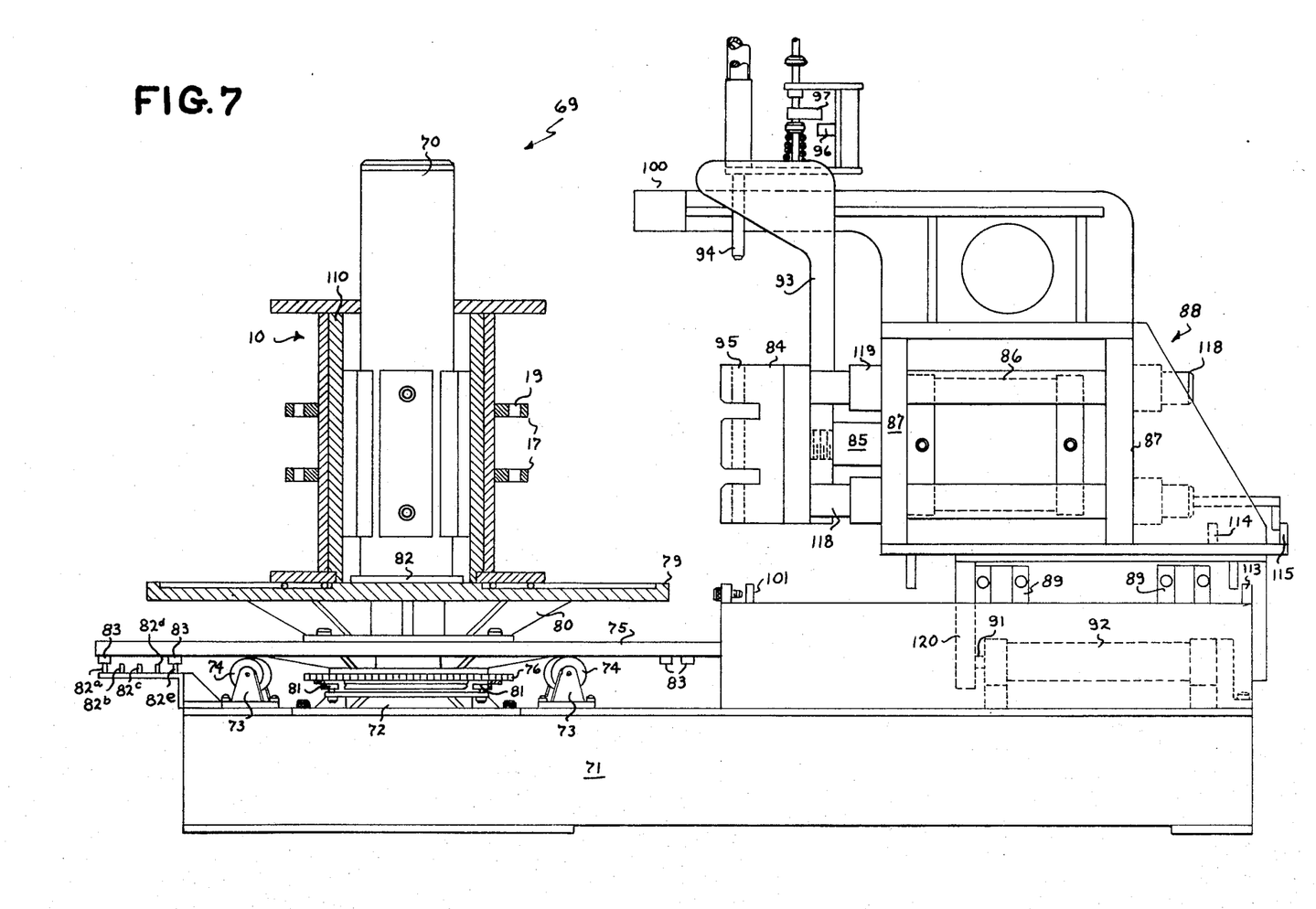
FIG. 7 is a sectional view of an automated stripping machine suitable for utilization with this invention.
Figure 8:
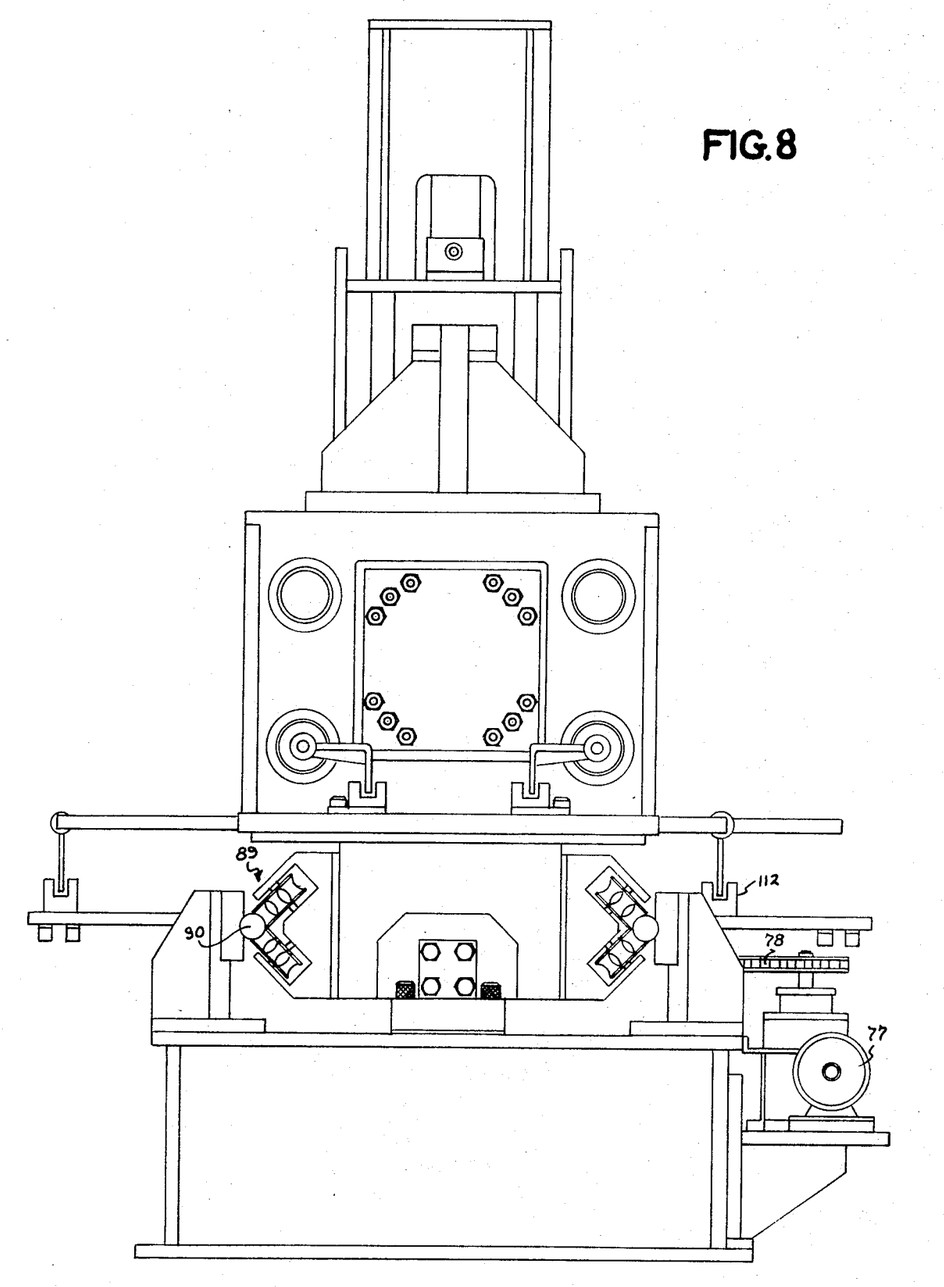
FIG. 8 is an end view of the stripping machine of FIG. 6.

After casting is completed, the ladle is removed from the mold interior (by opening valve 56B and venting valve 56A) whereafter hood 28 is rolled back to expose the mold. Because the mold is not fixedly secured to rollers 21, the mold can be lifted vertically from the rollers utilizing a crane (not illustrated). The mold then is placed atop a stripping machine 69 with vertical arbor 70 of the machine passing axially through the mold, as is illustrated in FIG. 7. Arbor 70 is fixedly secured to base 71 of the stripping machine while a gusseted collar 72 is circumferentially disposed about the lower periphery of the arbor to distribute the force being transmitted to the base. Housings 73 of caster wheels 74 also are secured to base 71 to serve as supports for main turntable 75 having a sprocket 76 secured to the lower edge thereof to permit the application of rotary torque from drive motor 77 (illustrated in FIG. 8) to the main turntable by way of link chain 78.

Returning again to FIG. 7, main turntable 75 functions as a support for upper turntable 79 (by way of gusseted collar 80) to insulate bearings 81 of the stripping machine from the heat of the mold while collar 82 is provided at the center of the upper turntable to shield the zone between the arbor and the turntable from falling debris and to seat the mold circumferentially about the arbor. A plurality of limit switches 82a–82e also are provided atop base 71 to be selectively actuated by cams 83 along the lower face of main turntable 75 to govern rotation of the turntables (as will be more fully explained hereinafter).

Stripping of the mold sections from the cast is accomplished by a jaw 84 threadedly engaged to the forward end of large piston 85 mounted within piston cylinder 86 (typically a 12 inch piston cylinder to permit the application of 100 tons stripping force to jaw 84). The outer edges of jaw 84 also are supported by guide pins 118 slidably engaged within guide cylinders 119 extending through support plates 87 of large piston housing 88. Because the large diameter of piston cylinder 86 necessitates a slow advance of piston jaw 84 for a given hydraulic pressure and entry orifice into the piston cylinder, piston housing 88 is mounted on roundway bearings 89 to permit rapid traversal of the piston housing along circular rails 90 (illustrated in FIG. 8). The drive for piston housing 88 is provided by a small diameter piston 91 mounted within piston cylinder 92 with the forward end of the piston being fixedly secured to the underside of piston housing 88 by cylinder rod mounting block 120.

The face of piston jaw 84 remote from arbor 70 serves as a support for a lock pin assembly 93 carrying 1 inch diameter steel lock pins 94 in a vertical disposition relative to apertures 95 extending vertically through the forward face of jaw 84. The lock pins are hydraulically driven and are provided with a tapered lower end to register the apertures within jaw 84 with apertures 19 in brackets 17 of mold 10 when the pins are driven downwardly subsequent to engagement of the jaw with the mold brackets. Conventional limit switches 96 also are provided on the lock pin assembly to detect a complete vertical traversal of the lock pins (i.e., upon triggering of the limit switches by vanes 97 mechanically linked to the drive pins) to initiate a subsequent phase of the stripping cycle as will be more fully explained hereinafter.

Figure 9:
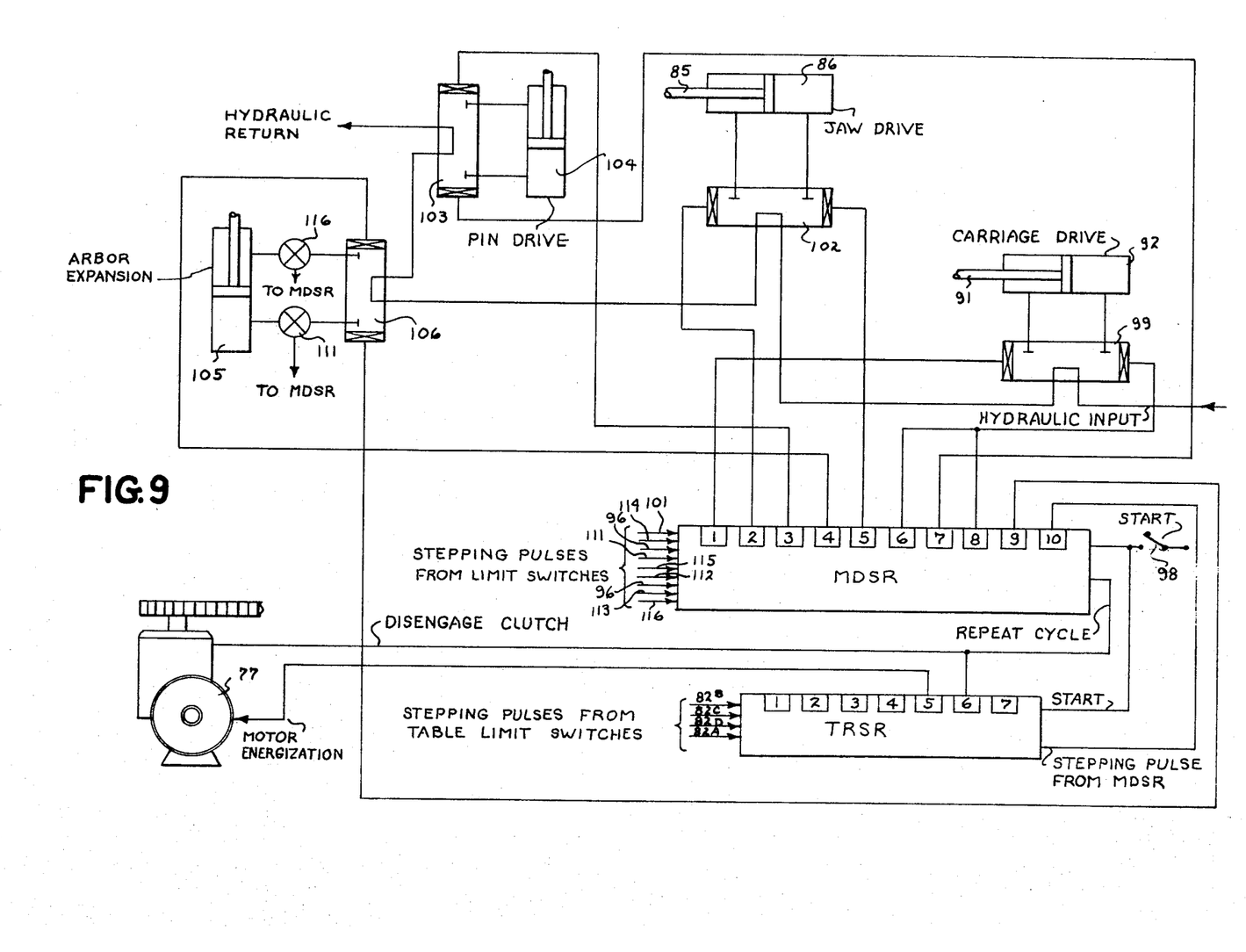
FIG. 9 is a diagram of the hydraulic system of the stripping machine showing the electrical controls for disassembly of the mold in schematic form.
Figure 10:
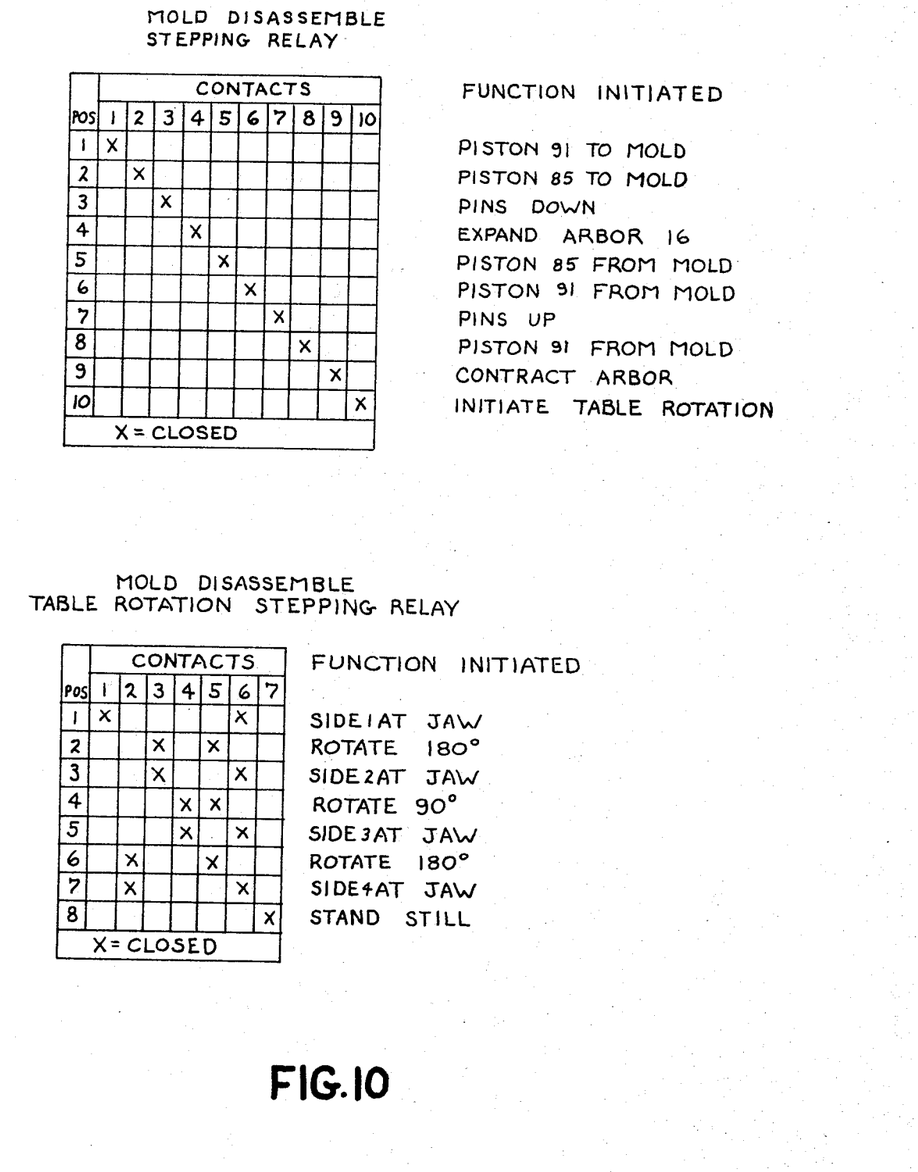
FIG. 10 is a chart portraying the sequential operation of the stepping relays of the stripping machine during disassembly of the mold.
Figure 11:
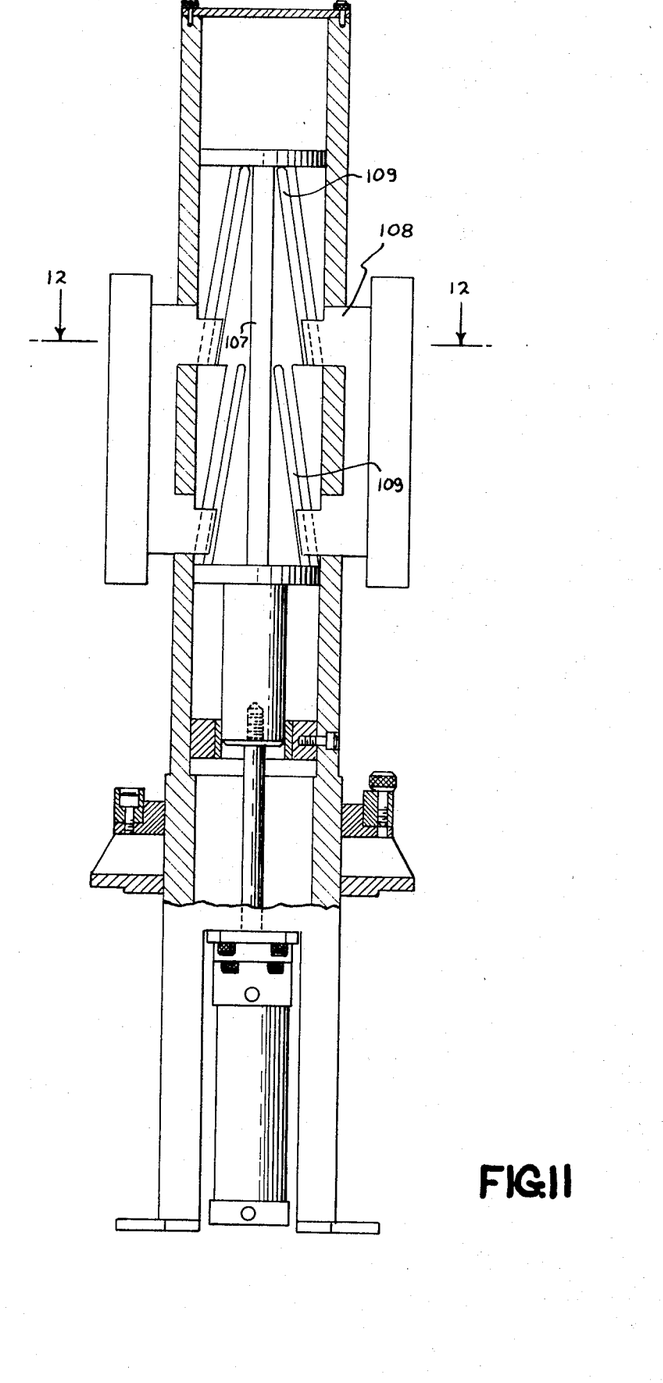
FIG. 11 is a sectional view of the stripping machine arbor.
Figure 12:
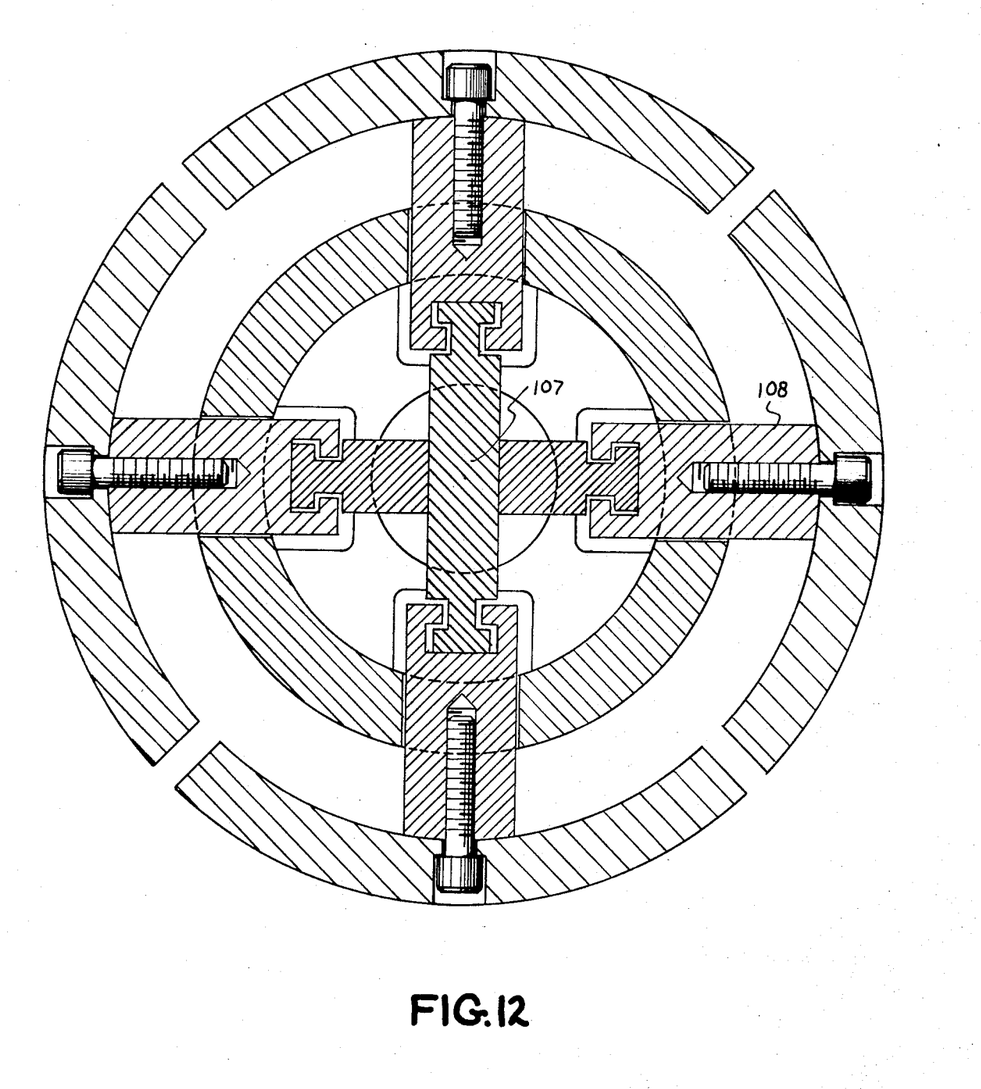
FIG. 12 is a sectional view taken along lines 12—12 of FIG. 11.

Stripping of the mold sections from the cast preferably is accomplished utilizing a ten position mold disassembly stepping relay MDSR and an eight position table rotation stepping relay TRSR to control the operation of various electromagnetic valves governing admission of hydraulic fluid to the hydraulic cylinders of the stripping machine as is illustrated in FIGS. 9 and 10. These stepping relays typically produce an output signal on successive output terminals upon triggering of the stepping relay by an external signal, e.g., from limit switches situated along the traversal path of the various components forming the stripping machine. To initiate stripping, start pushbutton 98 is depressed to place mold disassembly stepping relay MDSR and table rotation stepping relay TRSR in an initial position whereupon contact (1) of each relay is energized and electromagnetic valve 99 controlling the admission of hydraulic fluid to small diameter piston cylinder 92 is opened driving piston housing 88 to a location abutting arcuately shaped forward end 100 of the carriage housing against arbor 70. At the end of the carriage traversal, limit switch 101 mounted along base 71 is actuated and mold disassembly stepping relay MDSR is switched to a second position energizing contact (2) of the stepping relay to open valve 102 controlling the admission of hydraulic fluid to large piston cylinder 86. Jaw 84 then is driven toward mold 10 to mate with brackets 17 along the outer periphery of the mold. When jaw 84 has reached the limit of its desired travel, as determined by a suitably positioned limit switch 114 triggered at the end of the traversal of piston 85, mold disassembly relay MDSR is actuated by the limit switch to energize a third terminal of the stepping relay opening hydraulic valve 103 to admit hydraulic fluid to piston cylinder 104 driving lock pins 94 through the aligned apertures in the jaw and brackets of the mold. One of limit switches 96 monitoring the position of the drive pins then actuates mold disassembly relay MDSR to energize contact (4) of the relay admitting fluid to piston cylinder 105 through valve 106 to drive centerpost 107 (illustrated in FIGS. 11 and 12) within arbor 70 in an upward direction. Jaws 108 slidably meshed with tapered slots 109 of the centerpost are driven radially outward by the rising centerpost to engage the inner surface of cast 110 whereupon pressure switch 111 within the hydraulic line to cylinder 105 actuates mold disassembly stepping relay MDSR to energize contact (5) admitting hydraulic fluid to piston cylinder 86 in a direction retracting jaw 84 from arbor 70. Upon disengagement of the mold section from the underlying cast, as sensed by limit switch 115 actuated upon retraction of piston 85 a predetermined distance into cylinder 86, mold disassembly stepping relay MDSR is triggered to energize a sixth contact admitting hydraulic fluid to piston cylinder 92 retracting piston housing 88 by an amount to maintain the stripped mold section atop turntable 79. The mold disassembly stepping relay then is actuated by limit switch 112 (illustrated in FIG. 8) to energize the seventh contact of MDSR admitting hydraulic fluid to piston cylinder 104 to lift lock pins 94 from the jaw of the stripping machine. After the lock pins have been lifted, a lock pin limit switch 96 actuates mold disassembly stepping relay MDSR to energize the eighth contact of the relay retracting piston housing 88 radially from arbor 70 and disengaging jaw 84 from the stripped mold section. When the piston cylinder housing has been withdrawn sufficiently to inhibit interference with the stripped mold section, mold disassembly stepping relay MDSR is triggered by limit switch 113 to energize a ninth contact of the mold disassembly stepping relay admitting hydraulic fluid to piston cylinder 105 driving centerpost 107 downwardly and retracting jaws 108 from contact with the cast interior. Pressure switch 116 then actuates mold disassembly stepping relay MDSR to a tenth position triggering table rotation stepping relay TRSR to a second position energizing the third and fifth contacts of the relay. Energization of the fifth contact of relay TRSR initiates rotation of drive motor 77 to rotate turntable 79 by 180° until limit switch 82b is actuated by one of cams 83 to advance table rotation stepping relay TRSR to a third position de-energizing contact (5) and energizing contact (6) of the relay. Energization of the sixth contact of TRSR recycles mold disassembly stepping relay MDSR to strip a subsequent mold section from the cast in the manner heretofore described. When the section is stripped from the cast, table rotation stepping relay TRSR is advanced to a fourth position re-energizing contact (5) of TRSR to rotate turntable 79 by 90° to position a third mold section for stripping by jaw 84 wherafter turntable 79 is rotated 180° to strip the fourth section in similar manner from the cast. The cast motor frame then can be vertically lifted from the arbor to be deposited in a suitable location for cooling.

Figure 13:
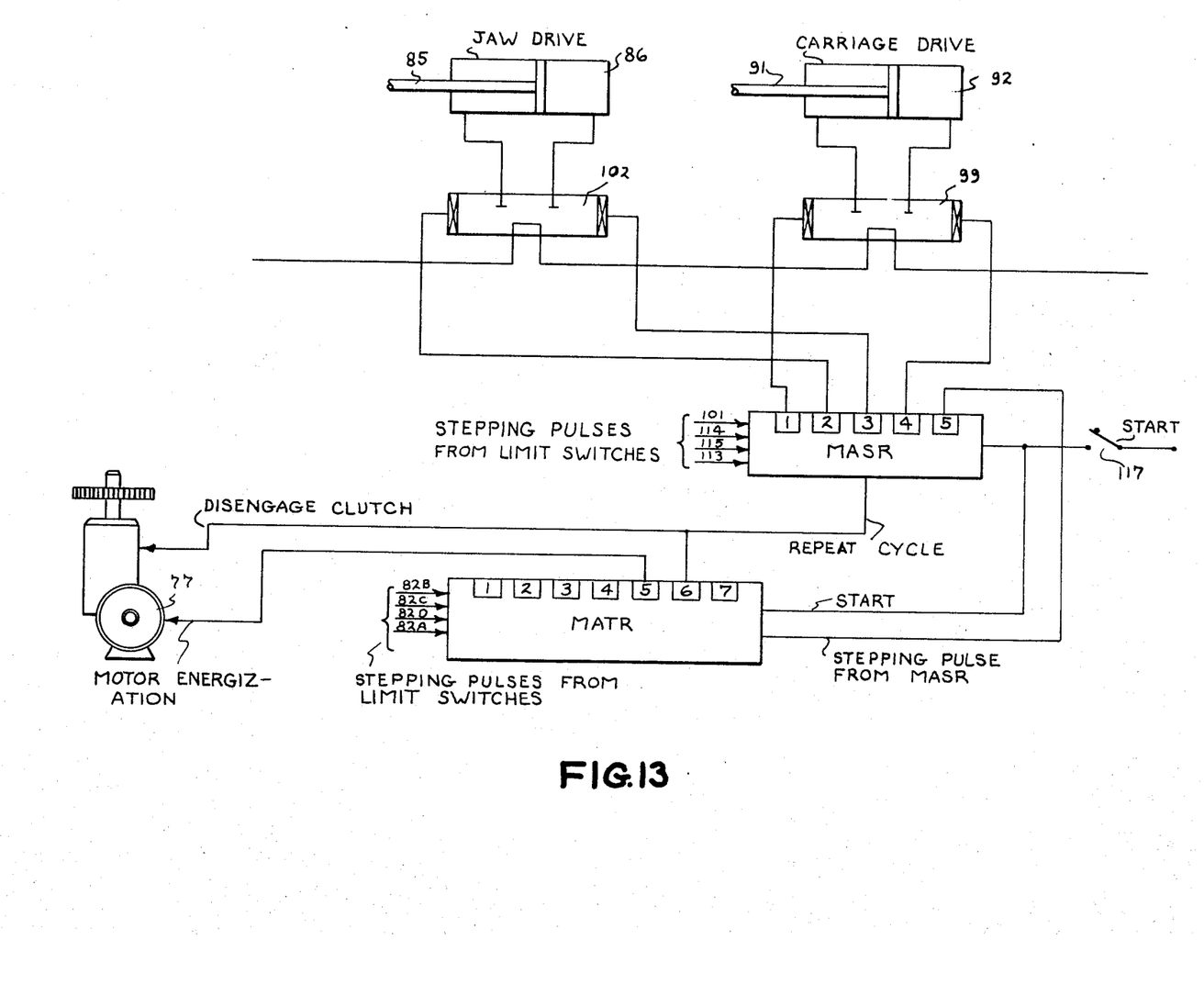
FIG. 13 is a diagram showing the hydraulic and electric controls for reassembly of the mold.
Figure 14:
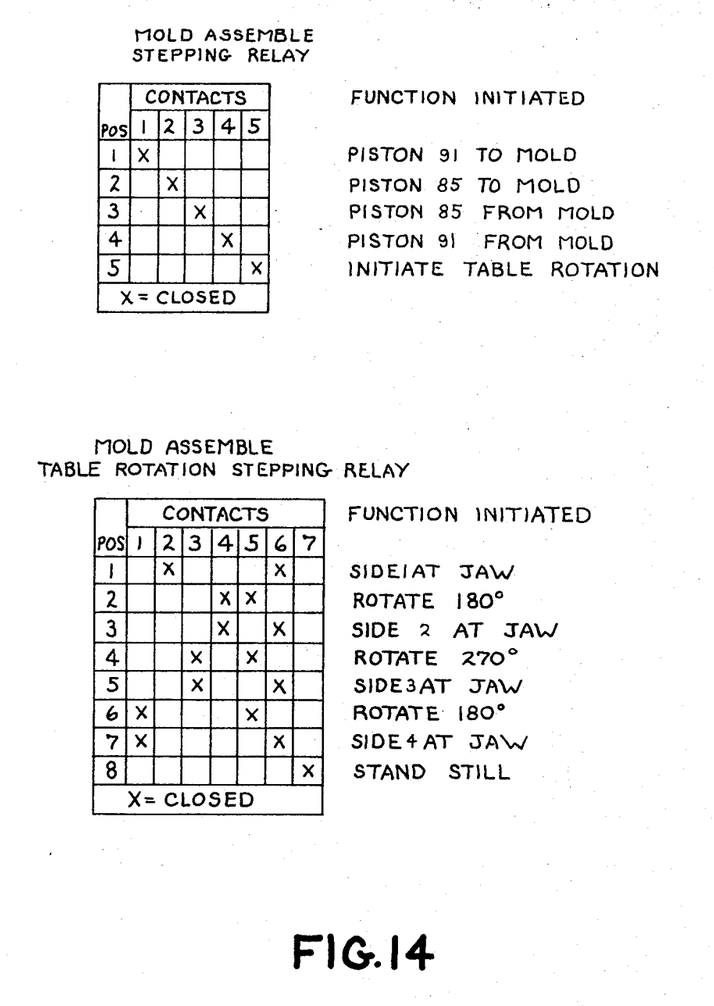
FIG. 14 is a chart portraying the sequential operation of the stepping relays of the stripping machine during reassembly of the mold.

Referring to FIGS. 13 and 14, reassembly of the mold by the stripping machine is accomplished utilizing a five position mold assembly stepping relay MASR and an eight position mold assembly table rotation stepping relay MATR to control the large and small diameter pistons utilized to traverse jaw 84 relative to arbor 70. Mold assembly is initiated by depressing switch 117 to place mold assembly stepping relay MASR and mold assembly table rotation stepping relay MATR in a first position energizing the first contact of each relay to admit hydraulic fluid to piston cylinder 92 driving piston housing 88 toward the juxtaposed stripped mold section. At the end of the traversal of the piston housing, limit switch 101 triggers mold assembly stripping relay MASR to a second position, energizing contact (2) to admit hydraulic fluid to piston cylinder 86 pushing jaw 84 against a stripped section juxtaposed therewith to move the section to the original location of the section upon the cast. Mold assembly stepping relay MASR then is triggered by a limit switch 114 to a third position admitting hydraulic fluid in an opposite direction to large diameter piston cylinder 86 to retract jaw 84 from the pushed mold section whereafter the mold assembly stepping relay is triggered by limit switch 115 to a fourth position retracting piston 91 into piston cylinder 92 to move piston housing 88 radially from arbor 61. At the end of the traversal for the piston housing, the mold assembly stepping relay is triggered to a fifth position energizing contact (5) to provide a stepping pulse to mold assembly table rotation stepping relay MATR energizing contacts (4) and (5) of the relay to rotate turntable 79 by 180° thereby juxtaposing a second mold section proximate jaw 84. Upon completion of the turntable rotation, as determined by limit switch 82b, mold assembly table rotation stepping relay is advanced to a third position energizing contacts (4) and (6) to recycle mold assembly stepping relay MASR. After the second stripped mold section has been pushed by jaw 84 to its original position upon the cast prior to stripping (in a manner heretofore described), the mold assembly table rotation stepping relay MATR rotates turntable 79 by 270° to position a third mold section proximate jaw whereafter the pushing cycle is again repeated. The operation and structural features of stripping machine 69, per se, are described and claimed in LaBahn et al. application Ser. No. 220,280 filed concurrently herewith and assigned to the instant assignee.

After all the mold sections have been pushed into location, bolts 15 are inserted through eyelets 11 and tightened into nuts 16 to mechanically join the mold sections. The mold can be removed from the arbor to be placed upon rollers 21 for casting of a subsequent machine frame.

what we claim as new and desire to secure by Letters Patent of the United States is:

1. A method of casting a cylindrical frame having a plurality of fins extending outwardly from the exterior surface of said frame, said method comprising:
   a. mutually joining individual sections of a multisectioned mold to produce a frame mold having a slotted cylindrical inner surface substantially complimentary to the machine frame to be cast, said mold being further characterized by a smooth cylindrical exterior surface situated along at least a portion of the axial span of said mold,
   b. disposing said mold in an approximately horizontal position atop at least two arcuately displaced rotatable members in communication with the smooth cylindrical exterior surface of said mold and applying rotary torque to at least one of said members to rotate said mold about said mold axis,
   c. pouring molten metal into the interior of said mold during rotation to centrifugally cast a finned machine frame within said mold,
   d. removing said mold from said rotatable members and positioning said mold in a substantially vertical disposition atop an arbor extending axially therethrough,
   e. stripping said mold sections from said cast by the application of force to said mold sections in a direction perpendicular to the axis of said mold to radially remove said sections from said cast, each radially removed section being disposed substantially parallel to the cast,
   f. removing said cast from an interior location relative to said stripped mold sections, and g. applying force to said mold sections in a direction opposite said stripping force to re-assemble said sections into a composite frame mold.

2. A method of casting a cylindrical frame according to claim 1 wherein said smooth cylindrical surface along said mold is a plurality of axially displaced wheels formed by juxtaposition of mold sections having arcuate segments of said wheels fixedly secured thereto and said rotary torque is applied to said mold by positioning said mold atop said rotatable members and rotating said members to transmit said torque to the wheels of said mold.

3. A method of casting a cylindrical frame according to claim 2 wherein said rotatable members are elongated rollers upon which said wheeled mold is set and further including disposing retaining means in an overlying attitude relative to said mold prior to casting to inhibit disengagement of said mold from said rollers.

4. A method of casting a cylindrical frame according to claim 1 wherein each mold section is provided with a base disposed in a plane substantially orthogonal to the axis of said assembled mold and stripping said mold sections from said cast is accomplished by applying a stripping force to an individual mold section, removing said stripping force from said section to stand said section upon said base, rotating said stripped mold section and said centrifugal cast frame and attached mold sections a predetermined distance to register a second mold section with said stripping force, and stripping said second mold section from said cast.

5. A method of casting a cylindrical frame according to claim 4 further including expanding at least a portion of said arbor to engage the interior of said cast prior to application of stripping force to said mold sections and retracting said expanded arbor portion from engagement with said cast prior to rotation of said cast to a subsequent stripping position to permit said arbor to remain rotationally stationary during movement of said mold sections and cast.

* * * * *